US005866810A

United States Patent [19]

Ries-Müller

[11] Patent Number: 5,866,810

[45] Date of Patent: Feb. 2, 1999

[54] METHOD OF DETECTING DISTURBANCES IN AN INTERNAL COMBUSTION ENGINE CAUSED BY AN EMPTY FUEL TANK

[75] Inventor: Klaus Ries-Müller, Bad Rappenau, Germany

[73] Assignee: Robert Bosch GmbH, Stuttgart, Germany

[21] Appl. No.: 980,622

[22] Filed: Dec. 1, 1997

[30] Foreign Application Priority Data

Nov. 29, 1996 [DE] Germany ........................ 194 49 484.2

[51] Int. Cl.[6] ............................ G01M 15/00; F02B 1/00; F02D 1/00

[52] U.S. Cl. .......................... 73/117.3; 73/23.32; 73/116; 123/419; 123/436; 701/110; 701/112

[58] Field of Search ............................... 73/23.31, 23.32, 73/116, 117.2, 117.3, 118.1; 123/419, 425, 436; 701/101, 110, 112

[56] References Cited

U.S. PATENT DOCUMENTS

| | | | |
|---|---|---|---|
| 4,751,907 | 6/1988 | Yamamoto et al. | 73/23.32 |
| 5,200,899 | 4/1993 | Ribbens et al. | 123/419 |
| 5,513,521 | 5/1996 | Klenk et al. | 73/117.3 |
| 5,672,817 | 9/1997 | Sagisaka et al. | 73/23.32 |

*Primary Examiner*—George Dombroske
*Attorney, Agent, or Firm*—Walter Ottesen

[57] ABSTRACT

The invention is directed to a method of detecting disturbances of the crankshaft rpm for an internal combustion engine which are caused by an empty tank. Uneven-running values (LU) of the engine are detected which are distributed in bands of values and the spacing between the bands of uneven-running values (LU) is computed. A quantity of the engine is detected which is relevant to the exhaust gas of the engine. A check is then made to determine whether the computed band spacing is less than a pregiven threshold spacing and whether the exhaust-gas relevant quantity lies within a pregiven threshold value interval and, if so, this data is utilized as an indication that the disturbances of the crankshaft rpm are caused by an empty tank.

6 Claims, 2 Drawing Sheets

METHOD OF DETECTING DISTURBANCES IN AN INTERNAL COMBUSTION ENGINE CAUSED BY AN EMPTY FUEL TANK

FIELD OF THE INVENTION

The invention relates to a method for detecting disturbances in an internal combustion engine which are caused by an empty fuel tank. The method is based on the evaluation of fluctuations of the crankshaft rpm.

BACKGROUND OF THE INVENTION

In motor vehicles, which are equipped with catalytic converters, driving the vehicle until the tank is completely empty can lead to malfunctions of the catalytic converter and to other disturbances of the engine. When the content of the fuel tank goes to empty, the fuel pump sporadically pumps vapor instead of liquid. The required fuel metering to one or several cylinders of the engine can drop to such an extent that combustion misfires occur. The uncombusted fuel is then afterburned together with oxygen in the catalytic converter whereby the temperature of the catalytic converter increases. The temperature increase can be so great that permanent damage can occur to the catalytic converter.

The regulations of the California environmental authority (CARB) as well as United States federal regulations require that an automobile manufacturer must replace a defective catalytic converter within the first 100,000 miles. In addition, if, during the warranty period, a specific percentage of catalytic converters becomes defective, the California environmental authority even requires a recall. Such measures are most disadvantageous to automobile manufacturers since they are associated with considerable difficulty and expense. Furthermore, the reputation of the manufacturer can suffer damage in the marketplace.

In view of the above, there is a very substantial interest on the part of the automobile manufacturers to distinguish catalytic converter malfunctions, which are caused by the conduct of the driver (such as unpermittingly driving until the fuel tank is empty), from malfunctions caused by equipment failure.

A further requirement of the California environmental authority since mid 1994 requires that a diagnosis be made with on-board means to check the operability of the vehicle systems. These requirements include, inter alia, that a check of the operation of the catalytic converter be made with on-board means. As soon as a defect of a technical nature occurs, this defect must be signalized to the driver of the vehicle and stored in a memory in order to later, via a read-out of the memory, be able to make a statement as to whether the defect is of a technical nature or whether the defect was caused by improper conduct on the part of the driver operating the vehicle.

As mentioned above, for an almost empty tank, combustion misfires occur which cause crankshaft rpm fluctuations, that is, disturbances of the crankshaft rpm.

U.S. Pat. No. 5,513,521 discloses a method for detecting combustion misfires which permits combustion misfires and disturbances of the crankshaft rpm to be distinguished from each other. The disturbances of the crankshaft rpm are based on reactions of the vehicle drive train, for example, because of extreme roadway unevenness, because of jolting vehicle operation or because of a change of tire slip and tire adherence to the roadway.

This method permits precise differentiation of the above-mentioned disturbances of the crankshaft rpm from disturbances which are caused by combustion misfires. However, it is not possible to make a statement as to whether the combustion misfires or the disturbances of the crankshaft rpm are caused by an improper operation of the vehicle (for example, an empty tank) which can be attributed to the operator of the vehicle.

SUMMARY OF THE INVENTION

In view of the foregoing, it is an object of the invention to provide a method of detecting disturbances brought about by an empty tank for an internal combustion engine which method permits a statement to be made as to whether an empty tank is present or not. This recognition should be provided without additional sensor means.

The method of the invention is for detecting disturbances of the crankshaft rpm for an internal combustion engine which are caused by an empty tank. The method includes the steps of: detecting uneven-running values (LU) of the engine which are distributed in bands of values; computing the spacing between the bands of uneven-running values (LU); detecting a quantity of the engine which is relevant to the exhaust gas of the engine; checking to determine whether the computed band spacing is less than a pregiven threshold spacing and whether the exhaust-gas relevant quantity lies within a pregiven threshold value interval and, if so, utilizing this data as an indication that the disturbances of the crankshaft rpm are caused by an empty tank.

The invention is based on a method for detecting combustion misfires in an internal combustion engine as disclosed in U.S. Pat. No. 5,513,521 incorporated herein by reference.

Because of the method disclosed in U.S. Pat. No. 5,513,521, it is possible to distinguish combustion misfires from disturbances of the crankshaft rpm which are transmitted from the drive train to the engine.

The invention is based upon the recognition that the value range of uneven-running values in the case of an (almost) empty tank behaves in a manner similar to the value range in which rpm fluctuations are transferred from the drive train to the engine. The value range of the uneven-running values, which is caused by combustion misfires based on an empty tank, is not split into two bands as is the case, for example, for one or several defective spark plugs, cylinders or the like. More specifically, no splitting up of the bands occurs; instead, a relatively large irregular value range is produced which is caused by combustion misfires which occur essentially sporadically. With the method of the invention, it is possible to distinguish this range of uneven-running values (which occur because of an empty tank) from a value range similar thereto but caused by rpm fluctuations produced by reactions of the drive train of the vehicle.

Different exhaodiments are conceivable with respect to the detection of exhaust-gas relevant quantities. Accordingly, the exhaust-gas relevant quantity can, for example, be the lambda value of a lambda control. Here, it is advantageous that this value is anyhow continuously detected for the control of the engine so that no additional sensor is required.

Furthermore, the exhaust-gas relevant quantity can also be the fill level of the tank. A fill level transducer of the tank is likewise present for the fill level display of the tank so that the detection of the fill level value of the tank requires no additional sensor means.

In another advantageous embodiment, the rpm of the engine is detected as an exhaust-gas relevant quantity. This quantity is also continuously detected for the control of the engine so that here too no additional sensor means are required.

A further embodiment provides detecting the exhaust-gas relevant quantity from a comparison of the engine torque demand (which, for example, can be detected based on the position of the throttle flap) and the torque output which is determined, for example, by means of a torque sensor or by evaluating the rpm.

Finally, the road speed of the vehicle and therefore the energy total of the vehicle can be applied as an exhaust-gas relevant quantity.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
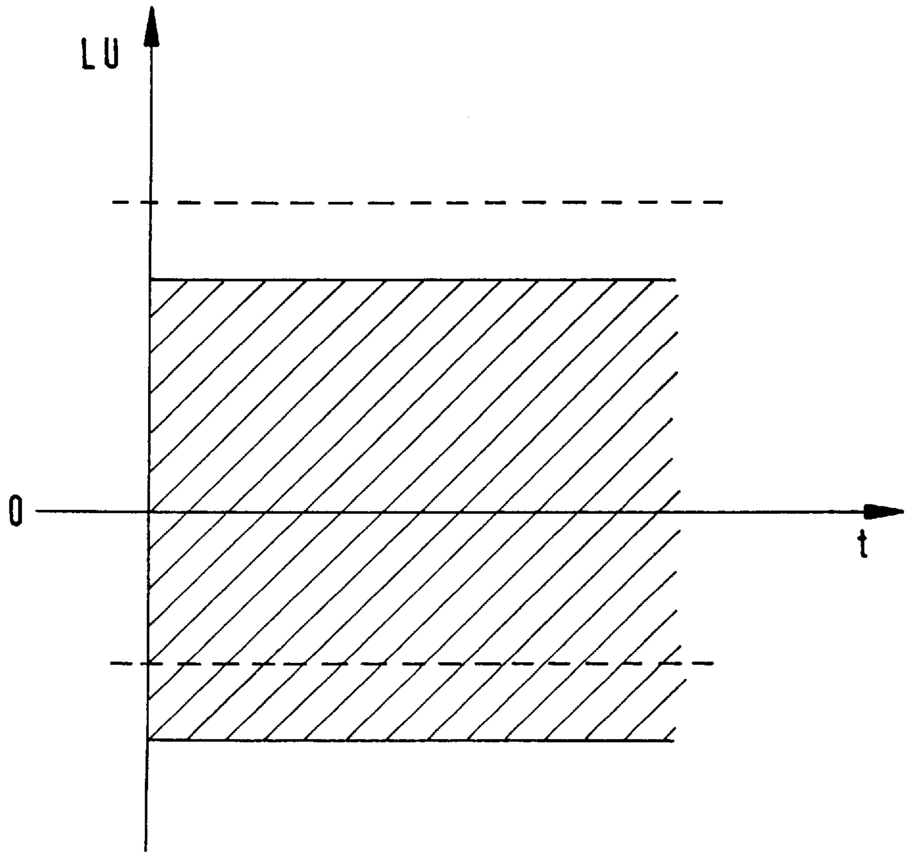
FIG. 1 is a diagram showing the time-dependent distribution of uneven-running values for engine operation with an almost empty tank; and, FIG. 2 shows an embodiment of the method of the invention in the context of a flowchart.

In the following, reference is made to U.S. Pat. No. 5,513,521 with respect to the computation of the uneven-running values as well as for computing the spacing between bands of uneven-running values as described hereinafter. The limits are shown in FIG. 1 by broken lines and correspond to the lines presented and explained in U.S. Pat. No. 5,513,521 incorporated herein by reference.

As shown in FIG. 1, the uneven-running values are scattered considerably over time and this is a consequence of sporadically occurring combustion misfires which are caused by an almost empty tank. In this case, the fuel pump (not shown) of the engine draws vapor sporadically by suction in lieu of fuel so that combustion misfires occur which, in turn, can lead to considerable damage of the catalytic converter of the engine because of afterburning occurring in the exhaust-gas system.

Figure 2:
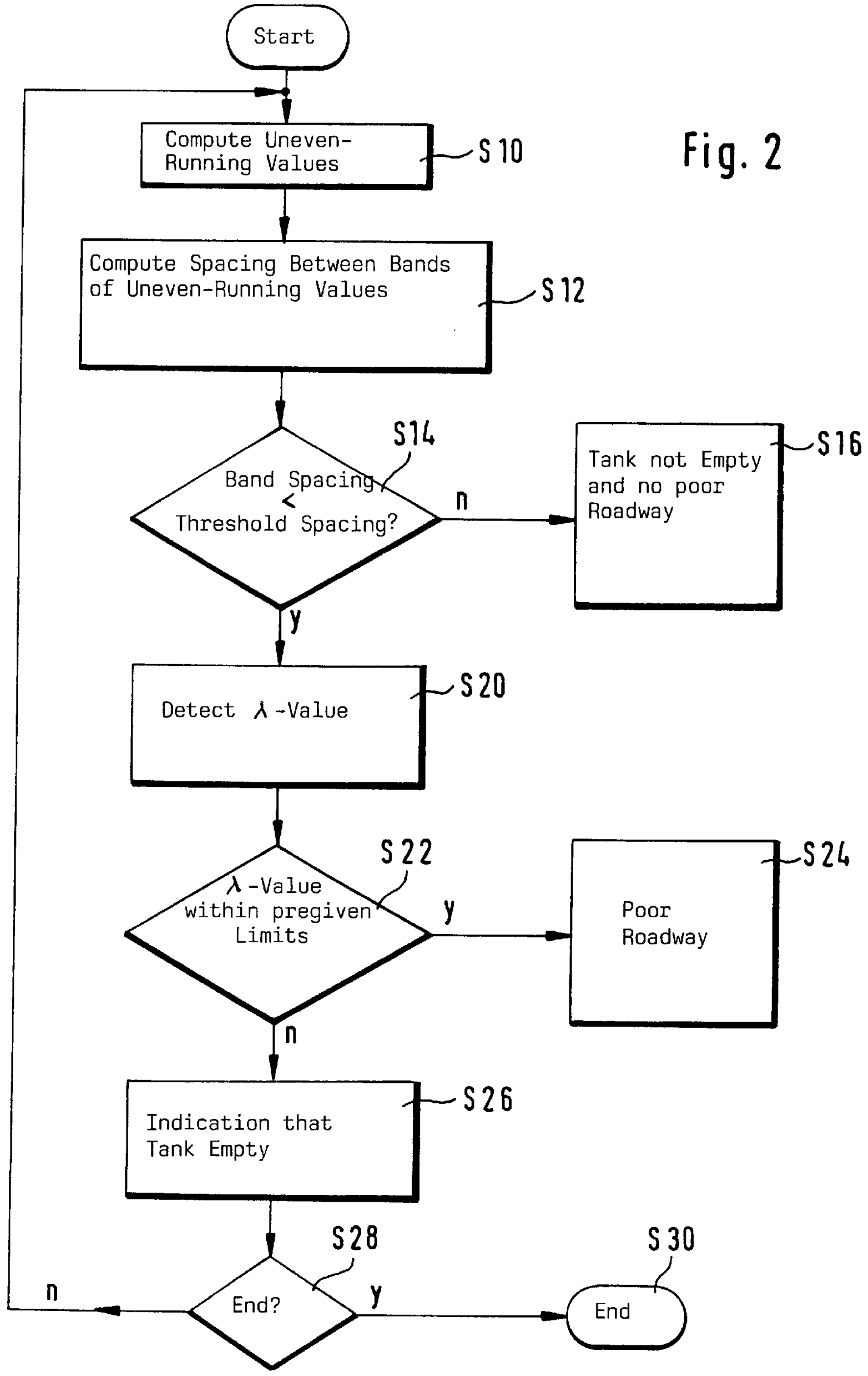

The method for detecting disturbances caused by an empty tank for an internal combustion engine is explained below in connection with FIG. 2. First, in a first step S10, the uneven-running values are computed. Thereafter, the spacing between the bands of uneven-running values is computed (step S12). In step S14, a check is made as to whether the band spacing is less than a pregiven threshold spacing and, if this is not the case, an output is given in step S16 that no empty tank is present and no disturbances of the crankshaft rpm are present caused by reactions of the drive train which, for example, can be caused by a poor roadway.

If the spacing between the bands is less than a pregiven threshold spacing, then, for example, the lambda value of the lambda control of the internal combustion engine is detected (step S20). This is advantageous because this lambda value is anyway continuously detected for the control of the engine so that no additional sensor is necessary.

In step S22, a check is made as to whether the detected lambda value lies within pregiven limits. If this is the case, then disturbances of the crankshaft rpm cannot be caused by feedback based on a poor roadway or the like. This is determined in step S24 and transmitted to the control circuit of the internal combustion engine (not shown). However, if the lambda value lies outside of the pregiven limits, this is an indication which points to an empty tank (step S26). This method can be repeated as required (step S28, step S30).

It is understood that next to the detection or in addition to the detection of the lambda value, also the fill level of the tank can be detected and evaluated. Always when the tank level drops below a specific pregiven threshold value, driving with an empty tank is to be expected and the capability is provided of distinguishing between disturbances of the crankshaft rpm, which are attributable to an empty tank, and disturbances of the crankshaft rpm, which are attributable to feedback of the drive train.

Furthermore, a comparison between the torque requirement, which can be detected by means of the throttle flap position, is possible. The difference is an exhaust-gas relevant value of the internal combustion engine because, for an empty tank, the torque requirement and the torque output of the engine differ considerably. The torque outputted by the engine can be determined, for example, by means of a torque sensor or by an evaluation of the rpm signal.

It is understood that the rpm can also be applied and evaluated as an exhaust-gas relevant quantity. Finally, it is also possible to apply the speed of the vehicle and therefore the total energy thereof.

It is understood that the foregoing description is that of the preferred embodiments of the invention and that various changes and modifications may be made thereto without departing from the spirit and scope of the invention as defined in the appended claims.

What is claimed is:

1. A method of detecting disturbances of the crankshaft rpm for an internal combustion engine which are caused by an empty tank, the method comprising the steps of:

detecting uneven-running values (LU) of said engine which are distributed in bands of values;

computing the spacing between said bands of uneven-running values (LU);

detecting a quantity of said engine which is relevant to the exhaust gas of said engine;

checking to determine whether the following conditions are satisfied:

(a) the computed band spacing is less than a pregiven threshold spacing; and, (b) said exhaust-gas relevant quantity lies within a pregiven threshold value interval and, if both of said conditions (a) and (b) are satisfied, then utilizing this data as an indication that said disturbances of said crankshaft rpm are caused by an empty tank.

2. The method of claim 1, wherein the exhaust-gas relevant quantity is the lambda value of a lambda control.

3. The method of claim 1, wherein the exhaust-gas relevant quantity is the fill level of said tank.

4. The method of claim 1, wherein the exhaust-gas relevant quantity is the rpm of said internal combustion engine.

5. A method of detecting disturbances of the crankshaft rpm for an internal combustion engine of a motor vehicle which are caused by an empty tank, the engine being operatively connected to an accelerator pedal with which an operator of the motor vehicle issues a torque requirement to the engine, the method comprising the steps of:

detecting uneven-running values (LU) of said engine which are distributed in bands of values;

computing the spacing between said bands of uneven-running values (LU);

detecting a quantity of said engine which is relevant to the exhaust gas of said engine;

checking to determine whether the computed band spacing is less than a pregiven threshold spacing and whether said exhaust-gas relevant quantity lies within a pregiven threshold value interval and, if so;

utilizing this data as an indication that said disturbance of said crankshaft rpm are caused by an empty tank; and, determining the exhaust-gas relevant quantity from a comparison of the torque requirement with the outputted torque of said internal combustion engine.

6. The method of claim 5, wherein the exhaust-gas relevant quantity is the road speed of a vehicle equipped with said internal combustion engine.

* * * * *

UNITED STATES PATENT AND TRADEMARK OFFICE

CERTIFICATE OF CORRECTION

PATENT NO. : 5,866,810
DATED : February 2, 1999
INVENTOR(S) : Klaus Ries-Mueller It is certified that error appears in the above-identified patent and that said Letters Patent is hereby corrected as shown below:

On the title page, under [30], line 2: delete "194 49 484.2" and substutute -- 196 49 484.2 --therefor.

In column 5, line 1: delete "disturbance" and substitute -- disturbances -- therefor.

Signed and Sealed this

Third Day of August, 1999

Attest:

Q. TODD DICKINSON

*Attesting Officer*

*Acting Commissioner of Patents and Trademarks*